United States Patent [19]
Mortimer

[11] Patent Number: 4,776,647
[45] Date of Patent: Oct. 11, 1988

[54] HYDRAULIC ANTI-SKID BRAKING SYSTEMS FOR VEHICLES

[75] Inventor: Ivan Mortimer, West Midlands, England

[73] Assignee: Lucas Industries Public Limited Company, United Kingdom

[21] Appl. No.: 901,562

[22] Filed: Aug. 28, 1986

[30] Foreign Application Priority Data

Sep. 5, 1985 [GB] United Kingdom ................. 8522064

[51] Int. Cl.$^4$ ............................ B60T 8/42; B60T 8/40
[52] U.S. Cl. .................................... 303/115; 303/116; 188/181 A
[58] Field of Search ..................... 303/10, 11, 113–119; 188/181 A

[56] References Cited

U.S. PATENT DOCUMENTS

| | | | |
|---|---|---|---|
| 3,574,416 | 4/1971 | Skoyles | 303/116 |
| 4,474,413 | 10/1984 | Farr | 303/116 |
| 4,556,260 | 12/1985 | Maehurd | 303/116 |

FOREIGN PATENT DOCUMENTS

| | | | |
|---|---|---|---|
| 2029914 | 8/1978 | United Kingdom | 188/181 A |
| 1493674 | 3/1980 | United Kingdom | 303/10 |

*Primary Examiner*—Andres Kashnikow
*Assistant Examiner*—Timothy Newholm
*Attorney, Agent, or Firm*—Laff, Whitesel, Conte & Saret

[57] ABSTRACT

In an anti-skid hydraulic braking system of the pump/re-apply type fluid is dumping from a working chamber into an auxiliary reservoir between a spring-loaded piston and the dump valve in response to a skid signal. When the dump valve closes the pump first withdraws fluid from the auxiliary reservoir in an unrestricted manner to re-apply the brake in a first stage up to a knee point at which a valve defined by the engagement of a head on the piston with a seating isolates the pump directly from the auxiliary reservoir. Thereafter the pump draws fluid from a main reservoir but at a reduced rate through a restricted orifice in the piston.

4 Claims, 3 Drawing Sheets

HYDRAULIC ANTI-SKID BRAKING SYSTEMS FOR VEHICLES

This invention relates to hydraulic anti-skid braking systems for vehicles of the kind in which a supply of operating fluid from a supply to a vehicle brake is modulated by a modulator assembly in accordance with skid signals from skid sensing means, and a hydraulic pump incorporating at least one plunger working in a bore has a working chamber which is in communication with the modulator assembly to control brake re-application following skid correction, a dump valve being operative in response to a skid signal to relieve fluid in the working chamber to a main reservoir, and the pump being operative to draw fluid from the main reservoir and pump it to the working chamber in response to a skid signal.

In anti-skid braking systems it is desirable to restrict the rate at which the brake-applying pressure can increase automatically during the same braking sequence and following correction of a skid in order to prevent the brake-applying pressure from rising at the same rate or original rate since, for the same conditions of wheel adhesion, such a rate of re-application will again cause the wheel deceleration to be excessive. In more complex systems it is known to include a memory which senses the skid pressure and ensures that the braking pressure in a subsequent brake re-application will normally be less than the skid pressure attained in the immediately preceding application in the same braking sequence and can rise only gradually to a pressure greater than the skid pressure and then only after a substantial interval of time.

In anti-skid braking systems of the kind set forth it is known to incorporate a restrictor on the inlet side of the pump to restrict the rate at which the pump can return fluid to the control chamber, with the restrictor being operative above a predetermined value of wheel velocity.

According to our invention in an anti-skid hydraulic braking system of the kind set forth fluid is dumped from the working chamber to an auxiliary reservoir of which the effective volume is variable, and communication between the auxiliary reservoir and the pump is controlled by means of a valve which is open during a first stage of brake re-application and which closes at a changeover or knee point to isolate the pump from the auxiliary reservoir, during the first stage of brake re-application in which the valve is open the pump is adapted to withdraw fluid directly from the auxiliary reservoir, and during a second stage when the valve is closed the pump is adapted to draw fluid from the main reservoir at a rate determined by flow through a restrictor.

The changeover or knee point at which the valve closes during brake re-application is determined by the volume of the auxiliary reservoir which is effective when the skid signal terminates and the dump valve closes, and the load in a spring which urges the valve towards its closed position.

The changeover or knee point is therefore said to be "time dependent" since it is determined by the length of time the valve has been open.

Preferably the valve comprises a piston working in a bore and carrying a valve head which is normally urged by the spring towards a seating surrounding a passage between the dump valve and the pump, and the auxiliary reservoir is defined in the bore between the dump valve and the piston, the restrictor comprising an orifice in the piston through which fluid is drawn by the pump from the main reservoir when the valve head is in engagement with the seating, and a second orifice in the piston provides communication between the auxiliary reservoir and the main reservoir.

When the dump valve is open in response to a skid signal the fluid from the working chamber is dumped to the auxiliary reservoir with the piston retracting in the bore against the load in the spring to increase the effective volume of the auxiliary reservoir. A proportion of the dumped fluid is transferred from the auxiliary reservoir to the main reservoir through the orifices in the piston.

After an interval of time has elapsed when the pressure of the fluid in the auxiliary reservoir acting on the end face of the piston is substantially equal to or less than the force of the spring acting on the opposite face of the piston, the piston moves in the opposite direction, to decrease the effective volume of the auxiliary reservoir and therefore decrease the volume of fluid available for use in the first stage of brake re-application and, during this movement, further fluid is returned from the auxiliary reservoir to the main reservoir. Thus for a relatively long skid signal the height of the knee point of brake re-application will be correspondingly lower.

One embodiment of our invention is illustrated in the accompanying drawings in which.

Figure 1:
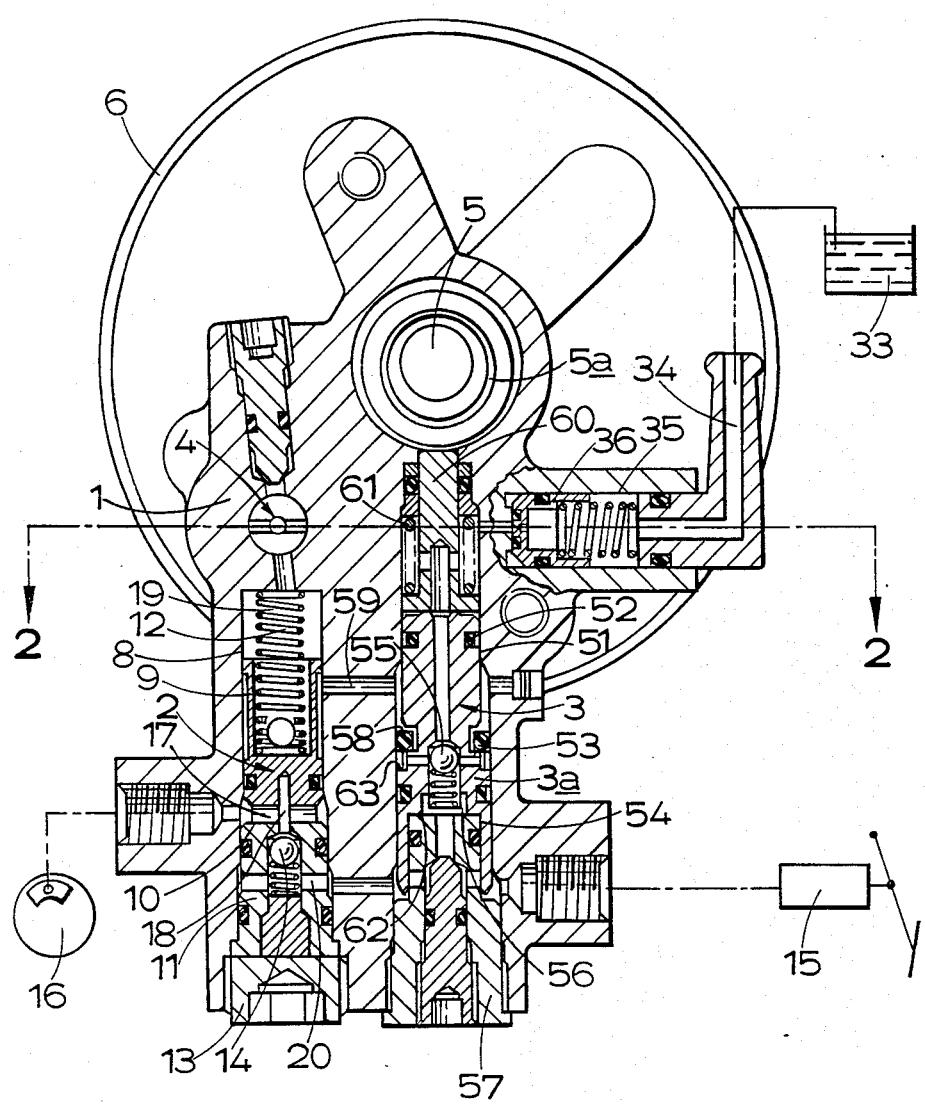
FIG. 1 is a transverse section through a combined modulator and skid sensing assembly for an hydraulic anti-skid braking system suitable for a motor-cycle or light passenger car or van.
Figure 2:
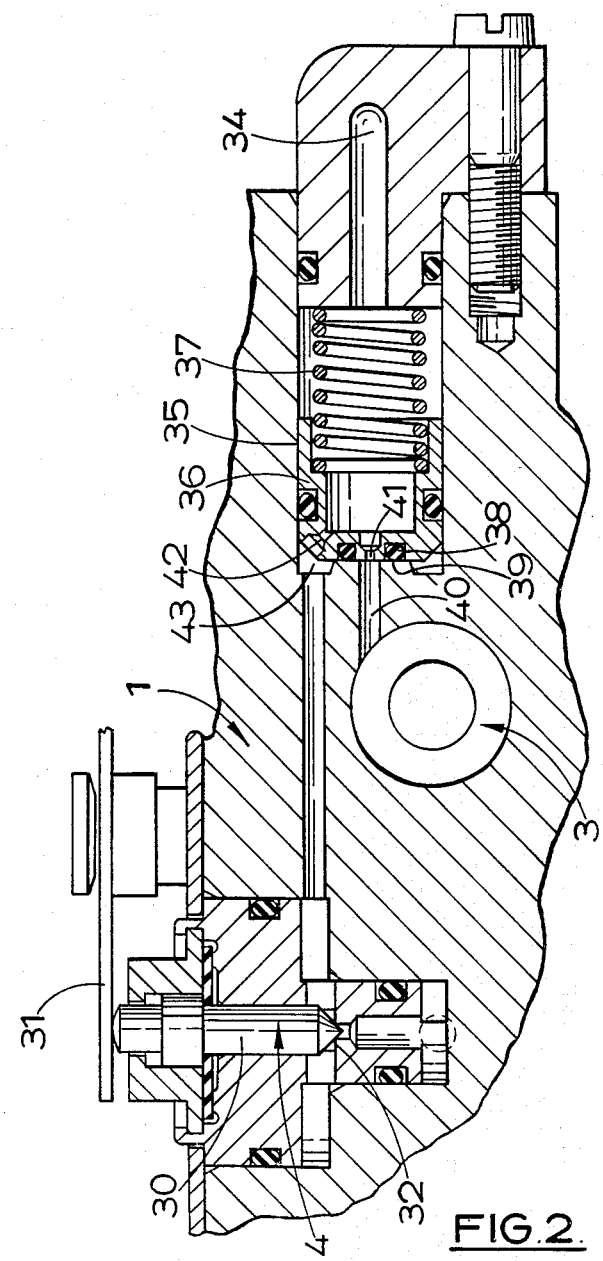
FIG. 2 is a section on an enlarged scale and at 90° to line 2—2 on FIG. 1.

The assembly illustrated in FIG. 1 of the drawings comprises a housing 1 incorporating a modulator assembly 2, a hydraulic pump assembly 3, and a pressure dump valve 4. A longitudinally extending shaft 5 projecting at opposite ends through the housing 1 is coupled at one end to a wheel to be braked and at the other end carries skid sensing means (not shown) which is enclosed within a cylindrical guard 6 carried from an adjacent end of the housing 1.

The pump 3 is urged in one direction by an eccentric 5a on the shaft 5 and in the opposite direction by pressure from a pedal-operated master cylinder 15 which acts over an operating piston 3a. The pump 3 will be described more fully later.

The modulator assembly 2 comprises a bore 8 extending from the dump valve 4 and in which works a de-boost piston 9. The piston 9 is normally urged into an inoperative position against a stop comprising a wall 10 at the closed end of a sleeve 11 substantially of cup-shaped outline by means of a spring 12, and the sleeve 11 is retained in the bore 8 by means of a closure 13 for the end of the bore 8 remote from the dump valve 4.

A control valve assembly 14 housed in the sleeve 11 controls communication between the master cylinder 15 and a wheel brake 16 through an expansion chamber 17 defined in the bore 8 between the piston 9 and the control valve assembly 14 itself.

In the normal inoperative position shown in the drawing the dump valve 4 is closed so that the piston 9 is held in an inoperative advanced position in which the valve assembly 14 is held open by the probe 18 by means of a volume of fluid trapped in the working chamber 19 defined in the bore 8 on the side of the piston 9 remote from the valve assembly 14.

When the brake is to be applied by operation of the master cylinder 15, hydraulic fluid is supplied to the brake through radial ports 20 in the wall of the sleeve 11, and through the open valve assembly 14 to the expansion chamber 17. Thus there is a substantially unrestricted flow of fluid to the brake.

The dump valve 4 comprises a valve member 30 which is normally urged into engagement with a seating 32 to isolate the working chamber 19 from a main reservoir 33 for fluid, by means of a lever 31 co-operating with the skid sensing means. A passage 34 leading to the reservoir 33 also leads into the peripheral edge of an enlarged bore 35 in which works a piston 36, and a spring 37 acts on the piston 36 normally to urge it relatively away from the reservoir 33 so that an annular valve head 38 carried by the closed end of the piston 36 engages with a seating 39 surrounding an axial passage 40 leading to the pump 3 to define a valve. An orifice 41 in the closed end of the piston 36 provides a restricted communication between the pump 3 and the reservoir 33 when the valve is closed, and a second orifice 42 in the edge of the crown of the piston 36 provides restricted communication between an auxiliary reservoir 43 and the reservoir 33.

The auxiliary reservoir 43 comprises a chamber of which the effective volume is variable and which is defined in the bore 35 at the inner end of the piston 36. In the position shown in the drawing the effective volume of the chamber 43 is at a minimum, and the auxiliary reservoir 43 is in communication with the reservoir 33 only through the second orifice 42.

The pump 3 comprises a plunger in the form of the operating piston 3a working in a stepped bore 51. The two portions of the piston 3a each carry a respective seal 52, 53.

A first one-way valve 55 is housed in the piston 3a and past which fluid is drawn into a pumping space 56 defined in a bore 54 upon movement of the piston 3a relatively away from a closure 57 for the open end of the bore 51. Upon movement of the piston 3a in the opposite direction fluid is displaced into the working chamber 19 from the pump chamber 56 and past a second one-way valve defined, in a known manner, by the engagement of the seal 53 with the bore 51 and the axially spaced walls of a groove 58 in which it is housed, and a passage 59.

In operation, the piston 3a is urged outwardly during the compression stroke by the eccentric 5a which acts on the piston 3a through a tappet 60, and the tappet 60 is biassed away from the eccentric 5a by means of a spring 61.

In an inoperative position when the pump 3 is disabled at b.d.c., the operating piston 3a is held in a retracted position against a stop defined by a face 62 at the outer end of the bore 51 by the trapped volume of fluid in the working chamber 19 which acts over a shoulder 63 on the piston 3a at a step at the change in diameter.

When a skid signal is received, the dump valve 4 opens to release the volume of fluid trapped in the working chamber 19 to the auxiliary reservoir 43 so that the piston 9 can retract against the force in the spring 12, initially to allow the valve assembly 14 to close. This cuts off communication between the master cylinder 15 and the brake 16, and the retraction of the piston 9 continues to increase the effective volume of the expansion chamber 17, whereby to relieve the pressure applied to the brake 16.

As fluid is dumped to the auxiliary reservoir 43, its effective volume increases with the piston 36 retracting against the force in the spring 37, and any additional, excess, fluid is returned to the reservoir 33 through the two orifices 41 and 42.

Opening the dump valve 4 also unbalances the pump 3 causing it to pump fluid in a closed circuit into the bore 8 from the auxiliary reservoir 43, to which it is returned, through the open dump valve 4. Since communication between the piston 3a and the master cylinder 15 is unrestricted, the pump 3 can move freely.

At the termination of the skid signal the dump valve 4 closes to isolate the bore 8 from the auxiliary reservoir 43 and the pump 3 is then operative to increase the pressure in the working chamber 19, with the result that the piston 9 is urged towards its operative, advanced, position and re-applies the brake by pressurising the volume of fluid trapped in the expansion chamber 17.

The increase in pressure in the working chamber 19 takes place in two stages. In the first stage fluid is withdrawn by the pump 3 from the auxiliary reservoir and the volume of fluid then present in it is transferred to the working chamber 19. After the head 38 engages with the seating 39 at a changeover or knee point the pump 3 then draws fluid from the main reservoir 33 but at a reduced rate determined by flow through the restricted orifice 41, the orifice 42 being rendered inoperative due to the engagement of the head 38 with the seating 39.

The characteristics of the re-application cycle are dependent upon the volume of the auxiliary reservoir 43 at the point at which the dump valve 4 closes at the termination of the skid signal.

Specifically the piston 36 will move back towards the seating 39 effectively to reduce the volume of the auxiliary reservoir 43 when the pressure of the fluid in the auxiliary reservoir 43 acting on the end face of the piston 36 is substantially less than or equal to the force of the spring 37 acting on the opposite face of the piston 36.

Thus the volume of the auxiliary reservoir 43 is dependant upon the duration of the dump cycle and the pressure in the working chamber 19 at which the dump cycle is initiated. The effective volume of the auxiliary reservoir 43 will be reduced after a predetermined time with further fluid being returned to the reservoir 33 through both orifices 41 and 42. This, in consequence, will reduce the level of the knee point between the first stage and second stage of brake re-application.

The knee point is determined by the movement of the piston 36 towards the seating 39 and the transfer of fluid from the auxiliary reservoir 43 to the main reservoir 33 which depends upon the size of the two orifices 41 and 42. After the knee point is reached when the piston 36 engages with the seating 39, brake re-application in the second stage is determined by the rate at which the pump 2 can withdraw fluid from the reservoir 33 through the orifice 41. No fluid will be withdrawn through the orifice 42 since, normally, the dump valve 4 will have closed before the piston 36 has engaged the seating 39.

Figure 3:
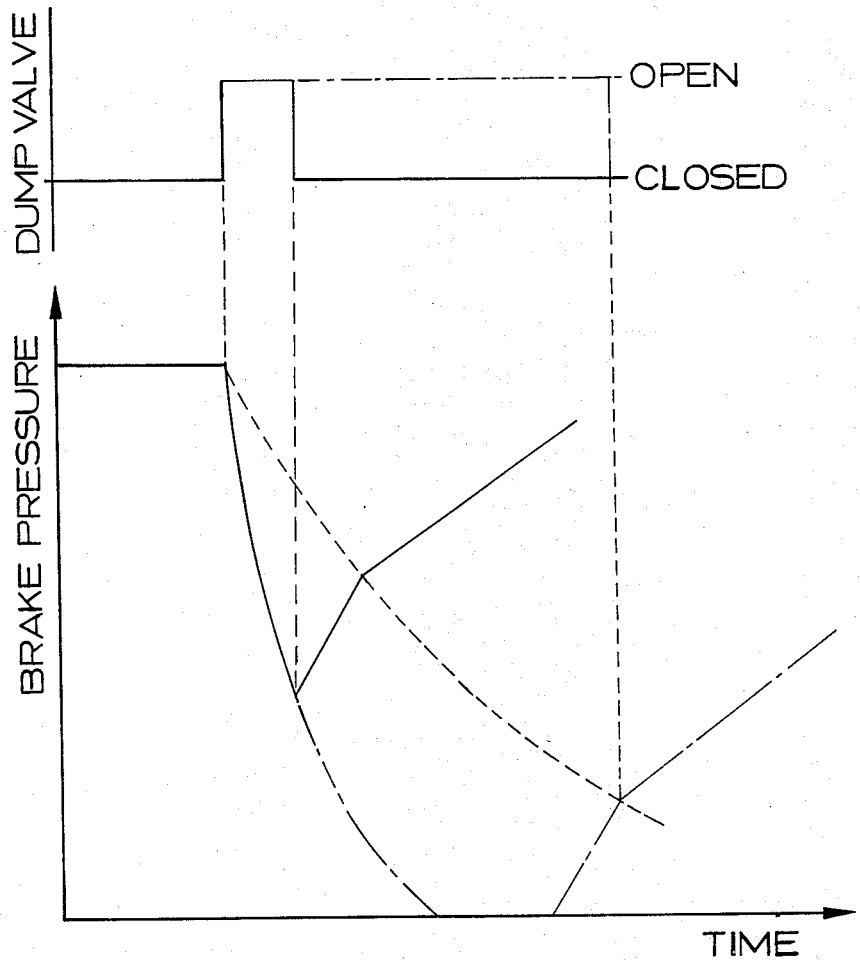
FIG. 3 is a graph showing the different relationships between brake-pressure, dump valve operation, and time.

The first and second stage of brake re-application are illustrated in the graph of FIG. 3.

I claim:

1. A hydraulic anti-skid braking system for vehicles comprising a brake on a wheel, a supply of operating fluid for applying said brake, means responsive to the behavior of said wheel for emitting skid signals when the deceleration of said wheel exceeds a predetermined value, a modulator assembly for modulating the supply of said operating fluid from said supply to said brake in accordance with said skid signals; said modulator assembly comprising a working chamber, a hydraulic pump incorporating at least one plunger working in a first bore in communication with said working chamber to control re-application of said brake following skid correction, a main reservoir for fluid, a dump valve operative in response to a skid signal to relieve fluid in said working chamber to said main reservoir, said pump being operative to draw fluid from said main reservoir and pump said fluid to said working chamber in response to a skid signal, a piston working in a second bore, an auxiliary reservoir defined in said second bore between said piston and said dump valve and of which the effective volume is variable by movement of said piston in said second bore, said auxiliary reservoir being separate from and distinct from said main reservoir and to which fluid from said working chamber is dumped, said effective volume of said auxiliary reservoir being adapted to increase to accommodate said fluid from said working chamber by displacement of said piston in said second bore, a restrictor between said pump and said main reservoir, and a control valve for controlling communication between said auxiliary reservoir and said pump and which is movable between an open position during a first stage of brake re-application and a closed position at a knee point to isolate said pump from said auxiliary reservoir, wherein during said first stage of brake re-application in which said control valve is in said open position said pump is adapted to withdraw fluid directly from said auxiliary reservoir, and during a second stage when said control valve is in said closed position said pump is adapted to draw fluid from said main reservoir at rate determined by flow through said restrictor.

2. A hydraulic anti-skid braking system for vehicles comprising a brake on a wheel, a supply of operating fluid for applying said brake, means responsive to the behavior of said wheel for emitting skid signals when the deceleration of said wheel exceeds a predetermined value, a modulator assembly for modulating the supply of said operating fluid from said supply to said brake in accordance with said skid signals; said modulator assembly comprising a hydraulic pump incorporating at least one plunger working in a bore and having a working chamber in communication with said modulator assembly to control re-application of said brake following skid correction, a main reservoir for fluid, a dump valve operative in response to a skid signal to relieve fluid in said working chamber to said main reservoir, said pump being operative to draw fluid from said main reservoir and pump said fluid to said working chamber in response to a skid signal, an auxiliary reservoir of which the effective volume is variable and to which fluid from said working chamber is dumped, a restrictor, and a valve for controlling communication between said auxiliary reservoir and said pump and which is movable between an open position during a first stage of brake re-application and a closed position at a knee point to isolate said pump from said auxiliary reservoir, wherein during said first stage of brake re-application in which said valve is in said open position said pump is adapted to withdraw fluid directly from said auxiliary reservoir, and during a second stage when said valve is in said closed position said pump is adapted to draw fluid from said main reservoir at rate determined by flow through said restrictor, wherein said control valve comprises a seating, and a valve head for engagement with said seating, and said restrictor is provided in said head.

3. A system as claimed in claim 1, wherein a spring urges said valve towards said closed position, and said knee point at which said valve moves into said closed position during brake re-application is determined by said volume of said auxiliary reservoir which is effective when said skid signal terminates and said dump valve closes, and the load in said spring.

4. A hydraulic anti-skid braking system for vehicles comprising a brake on a wheel, a supply of operating fluid for applying said brake, means responsive to the behavior of said wheel for emitting skid signals when the deceleration of said wheel exceeds a predetermined value, a modulator assembly for modulating the supply of said operating fluid from said supply to said brake in accordance with said skid signals; said modulator assembly comprising a hydraulic pump incorporating at least one plunger working in a bore and having a working chamber in communication with said modulator assembly to control re-application of said brake following skid correction, a main reservoir for fluid, a dump valve operative in response to a skid signal to relieve fluid in said working chamber to said main reservoir, said pump being operative to draw fluid from said main reservoir and pump said fluid to said working chamber in response to a skid signal, an auxiliary reservoir of which the effective volume is variable and to which fluid from said working chamber is dumped, a restrictor, and a valve for controlling communication between said auxiliary reservoir and said pump and which is movable between an open position during a first stage of brake re-application and a closed position at a knee point to isolate said pump from said auxiliary reservoir, wherein during said first stage of brake re-application in which said valve is in said open position said pump is adapted to withdraw fluid directly from said auxiliary reservoir, and during a second stage when said valve is in said closed position said pump is adapted to draw fluid from said main reservoir at rate determined by flow through said restrictor wherein said control valve comprises a seating, a spring, a piston working in a bore and carrying a valve head which is normally urged by said spring towards said seating, and said seating surrounding a passage between said dump valve and said pump, said auxiliary reservoir being defined in said bore between said dump valve and said piston, said restrictor comprising an orifice in said piston through which fluid is drawn by said pump from said main reservoir when said valve head is in engagement with said seating, and a second orifice in said piston providing communication between said auxiliary reservoir and said main reservoir.

* * * * *